US010530162B2

(12) United States Patent
Chatterjee et al.

(10) Patent No.: US 10,530,162 B2
(45) Date of Patent: Jan. 7, 2020

(54) METHODS AND DEVICES FOR INCREASING THE VOLTAGE GAIN RANGE OF A DC-DC POWER CONVERTER

(71) Applicant: KATHOLIEKE UNIVERSITEIT LEUVEN, Leuven (BE)

(72) Inventors: Urmimala Chatterjee, Heverlee (BE); Johan Driesen, Heverlee (BE); Alex Masolin, Udine (IT)

(73) Assignee: KATHOLIEKE UNIVERSITEIT LEUVEN, Leuven (BE)

(*) Notice: Subject to any disclaimer, the term of this patent is extended or adjusted under 35 U.S.C. 154(b) by 75 days.

(21) Appl. No.: 15/319,828

(22) PCT Filed: Jun. 22, 2015

(86) PCT No.: PCT/EP2015/064001
§ 371 (c)(1),
(2) Date: Dec. 19, 2016

(87) PCT Pub. No.: WO2015/193510
PCT Pub. Date: Dec. 23, 2015

(65) Prior Publication Data
US 2017/0133853 A1  May 11, 2017

(30) Foreign Application Priority Data
Jun. 20, 2014 (GB) .................................. 1411022.5

(51) Int. Cl.
  *H02J 3/38* (2006.01)
  *H02M 7/44* (2006.01)
  *H02M 3/158* (2006.01)
(52) U.S. Cl.
  CPC .............. *H02J 3/383* (2013.01); *H02M 3/158* (2013.01); *H02M 7/44* (2013.01)

(58) Field of Classification Search
  USPC .......................................................... 307/71
  See application file for complete search history.

(56) References Cited

U.S. PATENT DOCUMENTS 6,563,235 B1 * 5/2003 McIntyre ................ H02M 3/07
                                                        307/109
2007/0222501 A1   9/2007 Georgescu et al.
(Continued)

FOREIGN PATENT DOCUMENTS

CN         102969893    *  3/2013
CN         102969893 A     3/2013

OTHER PUBLICATIONS

Chatterjee et al., "Intra-Module DC-DC Converter: Topology Selection and Analysis," 28th EU PVSEC, 2013, pp. 3419-3423.
(Continued)

*Primary Examiner* — Rexford N Barnie
*Assistant Examiner* — Xuan Ly
(74) *Attorney, Agent, or Firm* — Workman Nydegger

(57) ABSTRACT

Circuits and methods for increasing the voltage gain range of a DC-DC power converter include: two multiplier stages, each comprising two capacitors, each capacitor respectively connected to a diode, which are adapted to charge the capacitors with a voltage; at least two switching devices arranged to interchangeably operate between the at least two multiplier stages, or arranged to selectively connect the at least two multiplier stages in series in a first mode of operation and to at least partly bypass one of the at least two multiplier stages in a second mode of operation, thereby increasing the voltage gain range of the DC-DC power converter.

18 Claims, 8 Drawing Sheets

(56) References Cited

U.S. PATENT DOCUMENTS

| | | | |
|---|---|---|---|
| 2008/0147335 A1* | 6/2008 | Adest | G01D 4/004 |
| | | | 702/64 |
| 2012/0249100 A1 | 10/2012 | Pan et al. | |
| 2014/0022005 A1 | 1/2014 | Ramanan et al. | |
| 2014/0265638 A1* | 9/2014 | Orr | H01L 31/02021 |
| | | | 307/131 |

OTHER PUBLICATIONS

Great Britain Search Report for corresponding Great Britain Application No. 1411022.5, dated Dec. 5, 2014.

International Search Report for corresponding International PCT Application No. PCT/EP2015/064001, dated Oct. 5, 2015.

Prudente et al., "Voltage Multiplier Cells Applied to Non-Isolated DC-DC Converters," IEEE Transactions on Power Electronics, Mar. 2008, pp. 871-887, vol. 23, No. 2.

Zhang et al., "Hybrid Boost Three-Level DC-DC Converter With High Voltage Gain for Photovoltaic Generation Systems," IEEE Transactions on Power Electronics, Aug. 2013, pp. 3659-3664, vol. 28, No. 8.

European Office Communication from EP Application No. 15730506.1, dated Apr. 8, 2019.

* cited by examiner

US 10,530,162 B2

METHODS AND DEVICES FOR INCREASING THE VOLTAGE GAIN RANGE OF A DC-DC POWER CONVERTER

TECHNICAL FIELD

The present invention relates to a circuit adapted to increase (or broaden) the voltage gain range of a DC-DC power converter, more specifically an auto-reconfigurable DC-DC converter. The device for increasing the voltage gain range of a DC-DC power converter may be used in a Photovoltaic Unit or Photovoltaic system as an inter- and/or intra-module DC-DC power converter. The invention also relates to a method of producing such a DC-DC power converter.

TECHNICAL BACKGROUND

Several types of power converters have been proposed in research literature based on the requirement of different applications. In state-of-the-art research, many examples of DC-DC converter are found for renewable energy system such as photovoltaic system, wind energy system, fuel cell powered system and so on. There are various ways to interface Photovoltaic (PV) modules with DC-AC inverter. Generally, the substrings of PV cells are connected in series in a PV module and the module is connected to the DC-DC converter before connecting to the DC-AC inverter since the low output voltage of PV module needs to be boosted to interface with the inverter. The output voltage of the substrings within a PV module varies from time to time inter alia due to the shading effect. This phenomenon also may affect the overall efficiency of the photovoltaic system in different operating conditions. Moreover, the generated current of the solar cells in a PV module can differ due to the shading effect in different parts of the module. These output power mismatch between the cells and/or substrings can cause significant power loss. In order to deal with the power mismatch problem at the module level distributed power management technique is presented in research literature. Although limited studies are available, some of the approaches in the literature deal with mismatch problems inside the module at the substring level. In order to overcome mismatch problem between substrings of the PV module an intra-module DC-DC converter for PV application has been presented by Chatterjee et al in 28$^{th}$ EU PVSEC, 2013, pp. 3419-3423. The design requirements and also the effectiveness of the designed converter as an intra-module converter have been discussed there.

In state of the art research, some of the literature focuses on the module level very high gain DC-DC converter to address the mismatch problem that decreases the impact of mismatches by performing MPPT (Maximum Power Point Tracking) at module level. Literature introduces several DC-DC converters of high dc-dc boost ratio multistage converter. In a previous attempt, high gain high power DC-DC boost converter is presented based on three state switching cell and voltage multiplier cell. Auto-transfer along with multiplier cells are used to achieve high voltage gain. A non-isolated three level hybrid boost converter is for instance proposed by Zhang et al, in IEEE Transactions on Power Electronics, Vol. 28, no. 8 (2013). No transformer or coupled inductor is used in this converter rather multiple power switches and diodes are used to achieve high gain.

The above mentioned converters are capable to achieve high voltage gain. However, wide input voltage range and wide voltage gain range are not addressed simultaneously. There is always room for improvements or alternatives.

SUMMARY OF THE INVENTION

It is an object of embodiments of the present invention to provide a good DC-DC power converter and a good method of producing same.

In particular, it is an object of embodiments of according to the present invention to provide a DC-DC power converter with an increased "voltage gain range" (meaning for example that the input voltage range is increased for a given output voltage range, and when all other parameters, e.g. efficiency, is kept the same).

According to a first aspect, the present invention relates to a DC-DC power converter, comprising: at least two multiplier stages, each multiplier stage comprising two capacitors, each capacitor respectively connected to a diode, said diodes being adapted to charge the capacitors with a voltage; at least two switching devices; characterized in that said at least two switching devices are arranged to interchangeably operate between the at least two multiplier stages; or said at least two switching devices are arranged to selectively connect the at least two multiplier stages in series in a first mode of operation and to at least partly bypass one of the at least two multiplier stages in a second mode of operation, thereby increasing the voltage gain range of the DC-DC power converter.

It is an advantage of embodiments according to the present invention that, it only requires two additional switches to be added to an existing DC-DC power converter, in order to increase the voltage gain range.

It is an advantage of such a DC-DC power converter, especially when used in a circuit where multiple DC power sources having different DC voltages, are connected in parallel to provide a combined DC power (such as series connections of solar cells, also known as "substrings"), because the larger gain range allows the combined output power to be increased, but the invention is not limited to solar panel applications, and may also be used for example in battery-applications or applications with several thermopiles connected in parallel.

With "at least partly bypassing" is meant for example "completely" bypassing one multiplier stage (so as to create a voltage drop of about 0.0V or 0.1V), or "substantially" bypassing one multiplier stage, except for a diode voltage drop (of for example about 0.6V or about 0.7 V).

In an embodiment, the DC-DC power converter comprises: a first multiplier stage comprising: a first and a second input node and a first and a second output node; and a first capacitor connected between the first input node and the first output node, and a second capacitor connected between the second input node and the second output node; and a first diode connected with its anode to the first input node and with its cathode to the second output node, and a second diode connected with its anode to the second input node and with its cathode to the first output node; and a second multiplier stage comprising: a third and a fourth input node and a third and a fourth output node; and a third capacitor connected between the third input node and the third output node, and a fourth capacitor connected between the fourth input node and the fourth output node; and a third diode connected with its anode to the third input node and with its cathode to the fourth output node, and a fourth diode connected with its anode to the fourth input node and with its cathode to the third output node; the first output node being connected to the third input node and the second output node being connected to the fourth input node; and wherein the DC-DC power converter comprises at least a first and a second switching device arranged to selectively connect the at least two multiplier stages in series in a first mode of operation, and to at least partly bypass one of the at least two multiplier stages in a second mode of operation, thereby increasing the voltage gain range of the DC-DC power converter.

It is an advantage of this circuit that the multiplier stage itself does not have inductors, only capacitors and diodes, which are relatively cheap and occupy relatively small space. Such a circuit is ideally suited for use inside a PV-panel or PV-module.

In an embodiment, the first switching device is connected in series with the first capacitor between the first input node and the first output node, and the second switching device is connected in series with the second capacitor between the second input node and the second output node, or the first switching device is connected in series with the third capacitor between the third input node and the third output node, and the second switching device is connected in series with the fourth capacitor between the fourth input node and the fourth output node.

This is a first embodiment of the present invention (and a variant thereof), where only two additional switches are needed to obtain the effect of increasing the voltage gain range.

In a first mode of operation, the first and second switches are both closed, so that the second multiplier stage functions are normal, and is connected in series with the first multiplier stage.

In a second mode of operation, the first and second switches are both open, so that the second multiplier stage acts as two diodes, which are connected in series with the first multiplier stage.

It is an advantage of this embodiment (over embodiments with 4 switches), that only two switches are required instead of four. This is an improvement in terms of component cost, power loss, board-space, but also in life-time of the entire product. In addition, it requires simpler control of a microcontroller, and/or less output pins, which is again important in terms of cost and power dissipation.

In an embodiment, the DC-DC power converter further comprises a third and a fourth switching device; and the first switching device is connected between the first output node and the third output node, and the second switching device is connected between the second output node and the fourth output node, and the third switching device is connected between the first output node and the third input node, and the fourth switching device is connected between the second output node and the fourth input node.

This is a second embodiment of the present invention, where four additional switches are needed to obtain the effect of increasing the voltage gain range.

In the first mode of operation, the first and second switch are both open, and the third and fourth switch are both closed, so that the second multiplier stage functions are normal, and is connected in series with the first multiplier stage. In a second mode of operation, the first and second switch are both closed and the third and fourth switch are both open, so that the second multiplier stage is completely bypassed.

It is an advantage of this embodiment (with four switches) over the embodiment with the two switches that no power is lost in the diodes when configured in the second mode.

In an embodiment, the DC-DC power converter further comprises a third and a fourth switching device; and the first switching device is connected between the first output node and the third output node, and the second switching device is connected between the second output node and the fourth output node, and the third switching device is connected in series with the third diode between the third input node and the fourth output node, and the fourth switching device is connected in series with the fourth diode between the fourth input and the third output node.

This is a first variant of the second embodiment of the present invention, offering the same advantages as the second embodiment.

In an embodiment, the DC-DC power converter further comprises a third and a fourth switching device; wherein the first switching device is connected between the first output node and the fourth output node, and the second switching device is connected between the second output node and the third output node, and the third switching device is connected between the first output node and the third input node and the fourth switching device is connected between the second output node and the fourth input node.

This is a second variant of the second embodiment of the present invention, offering the same advantages as the second embodiment.

In an embodiment, the DC-DC power converter further comprises: a first protection diode connected with its anode to a first output node of the second multiplier stage and with its cathode to an output node of the DC-DC converter; and a second protection diode connected with its anode to a second output node of the second multiplier stage and with its anode to the output node of the DC-DC power converter; and an output capacitor connected between a ground node of the DC-DC converter and the output node of the DC-DC power converter.

The first and second power switch are high-frequency power switches, e.g. capable of being switched ON and OFF at a frequency in the range of 10 kHz to 250 kHz, for example in the range of 25 kHz to 100 kHz, for example in the range of about 30 kHz to about 70 kHz, for example at a frequency of about 50 kHz.

In an embodiment, the DC-DC power converter further comprises: a first power switch arranged between the ground node and a first input node of the first multiplier stage and adapted for pulling a first current through a first inductance connectable to said first input node; a second power switch arranged between the ground node and a second input node of the first multiplier stage and adapted for pulling a second current through a second inductance connectable to said second input node.

In an embodiment, the at least two switching devices are adapted to be operated at a frequency lower than the frequency of the power switches.

The first, second, third, fourth switching devices may be fast power switches, e.g. MOSFETS, or may be relatively low frequency switches.

It is an advantage that the two switches (in the first embodiment and its variant), and the four switches (in the second embodiment and its variants) need not be "high-frequency MOSFETS" (meaning for example capable of switching at a frequency higher than 1 kHz or even higher than 10 kHz), but devices capable of switching at a much lower frequency, for example a frequency lower than 500 Hz, for example lower than 200 Hz, can also work. In practice these switches are only operated when needed, which may happen aperiodically, or even pseudo-randomly (e.g. depending on cloud movements).

In an embodiment, the at least two switching devices are electrical relays or solid state relays.

Electrical relays offer the additional advantage of being galvanically isolated from the rest of the circuit, thus increasing electrical safety. In embodiments having four additional switches (apart from the power switches), these four switches can be electrical relays or solid state relays.

In an embodiment, the DC-DC power converter further comprises said first inductance connected to the first input node, and said second inductance connected to the second input node.

In an embodiment, the DC-DC power converter is a non-isolated power converter.

In an embodiment, the DC-DC power converter is a boost power converter.

According to a second aspect, the present invention provides a photovoltaic unit comprising: at least one substring, the substring comprising a plurality of solar cells connected in series; at least one DC-DC power converter according to the first aspect, connected in series with the at least one substring, thereby functioning as an intra-module DC-DC power converter.

The Photovoltaic unit can be a photovoltaic panel (PV panel).

It is an advantage of this embodiment that the output voltage of the particular substring can be regulated, e.g. is a voltage within a predefined range.

In an embodiment, the photovoltaic unit comprises: at least two substrings connected in parallel, each substring comprising a plurality of solar cells connected in series, and each substring comprising at least one DC-DC power converter according to the first aspect connected in series with the at least one substring.

It is an advantage of this embodiment that the output voltage of both substrings can be regulated to be substantially the same voltage (within a predefined tolerance range, which range is larger than was possible in the prior art).

In an embodiment, the photovoltaic unit further comprises a controller adapted for selectively opening and closing the at least two switches.

The controller may use the value of the DC input voltage or a fraction thereof (for example a value obtained by means of a voltage divider) as input to determine whether the at least two switches (or four switches in the second embodiment) need to be opened or closed; for example so as to optimize the total output power.

Alternatively, or in combination, the controller may use the value of the DC output voltage of the DC-DC power controller as input to determine whether the at least two switches (or four switches in the second embodiment) need to be opened or closed, for example so as to optimize the total output power.

In an embodiment of the photovoltaic unit, the controller is further adapted for determining a duty cycle, and for generating a control signal with the determined duty cycle, and for applying the control signal to the first and second power switches.

According to a third aspect, the present invention provides a power system for controlling a plurality of photovoltaic units, the system comprising: a first photovoltaic unit according to the second aspect, comprising at least one first intra-module DC-DC converter, and adapted for generating a first voltage; a second photovoltaic unit according to the second aspect, comprising at least one second intra-module DC-DC converter, and adapted for generating a second voltage; the first photovoltaic unit and the second photovoltaic unit being connected in parallel or in series; a controller adapted to control the first voltage and the second voltage.

In an embodiment, the power system further comprises an inverter for converting the DC-power generated by the first and the second photovoltaic unit and for injecting the converted power into a public grid.

According to a fourth aspect, the present invention relates to the use of a DC-DC power converter according to the first aspect to increase its voltage gain range.

According to a fifth aspect, the present invention relates to the use of a DC-DC power converter according to the first aspect as an intra-module DC-DC power converter in a photovoltaic unit.

According to a sixth aspect, the present invention relates to the use of a DC-DC power converter according to the first aspect as a distributed DC-DC converter at sub string level of a photovoltaic unit.

According to a seventh aspect, the present invention relates to the use of a DC-DC power converter according to the first aspect to enable a distributed power management system.

According to an eighth aspect, the present invention relates to a method of manufacturing a DC-DC power converter, comprising the steps of: providing a first multiplier stage comprising: a first and a second input node and a first and a second output node; and a first capacitor connected between the first input node and the first output node, and a second capacitor connected between the second input node and the second output node; and a first diode connected with its anode to the first input node and with its cathode to the second output node, and a second diode connected with its anode to the second input node and with its cathode to the first output node; providing a second multiplier stage comprising: a third and a fourth input node and a third and a fourth output node; and a third capacitor connected between the third input node and the third output node, and a fourth capacitor connected between the fourth input node and the fourth output node; and a third diode connected with its anode to the third input node and with its cathode to the fourth output node, and a fourth diode connected with its anode to the fourth input node and with its cathode to the third output node; connecting the first multiplier stage to the second multiplier stage by connecting the first output node to the third input node and by connecting the second output node to the fourth input node; adding a first and a second switching device to the first multiplier stage or to the second multiplier stage for at least partly bypassing the first or the second multiplier stage thereby increasing the voltage gain range of the DC-DC power converter.

In an embodiment, the method comprises the steps: connecting the first switching device in series with the first capacitor between the first input node and the first output node, and connecting the second switching device in series with the second capacitor between the second input node and the second output node; or connecting the first switching device in series with the third capacitor between the third input node and the third output node, and connecting the second switching device in series with the fourth capacitor between the fourth input node and the fourth output node.

In an embodiment, the method further comprises the step of providing a third and a fourth switching device; and connecting the first switching device between the first output node and the third output node, and connecting the second switching device between the second output node and the fourth output node, and connecting the third switching device between the first output node and the third input node and connecting the fourth switching device between the second output node and the fourth input node.

In an embodiment, the method further comprises the step of providing a third and a fourth switching device; and connecting the first switching device between the first output node and the third output node, and connecting the second switching device between the second output node to the fourth output node, and connecting the third switching device in series with the third diode between the third input node, and connecting the fourth output node, and the fourth switching device in series with the fourth diode between the fourth input node and the third output node.

In an embodiment, the method further comprises the step of providing a third and a fourth switching device; and connecting the first switching device between the first output node and the fourth output node, and connecting the second switching device between the second output node and the third output node, and connecting the third switching device between the first output node and the third input node, and connecting the fourth switching device between the second output node and the fourth input node.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

Further features of the present invention will become apparent from the examples and figures, wherein.

Figure 1:
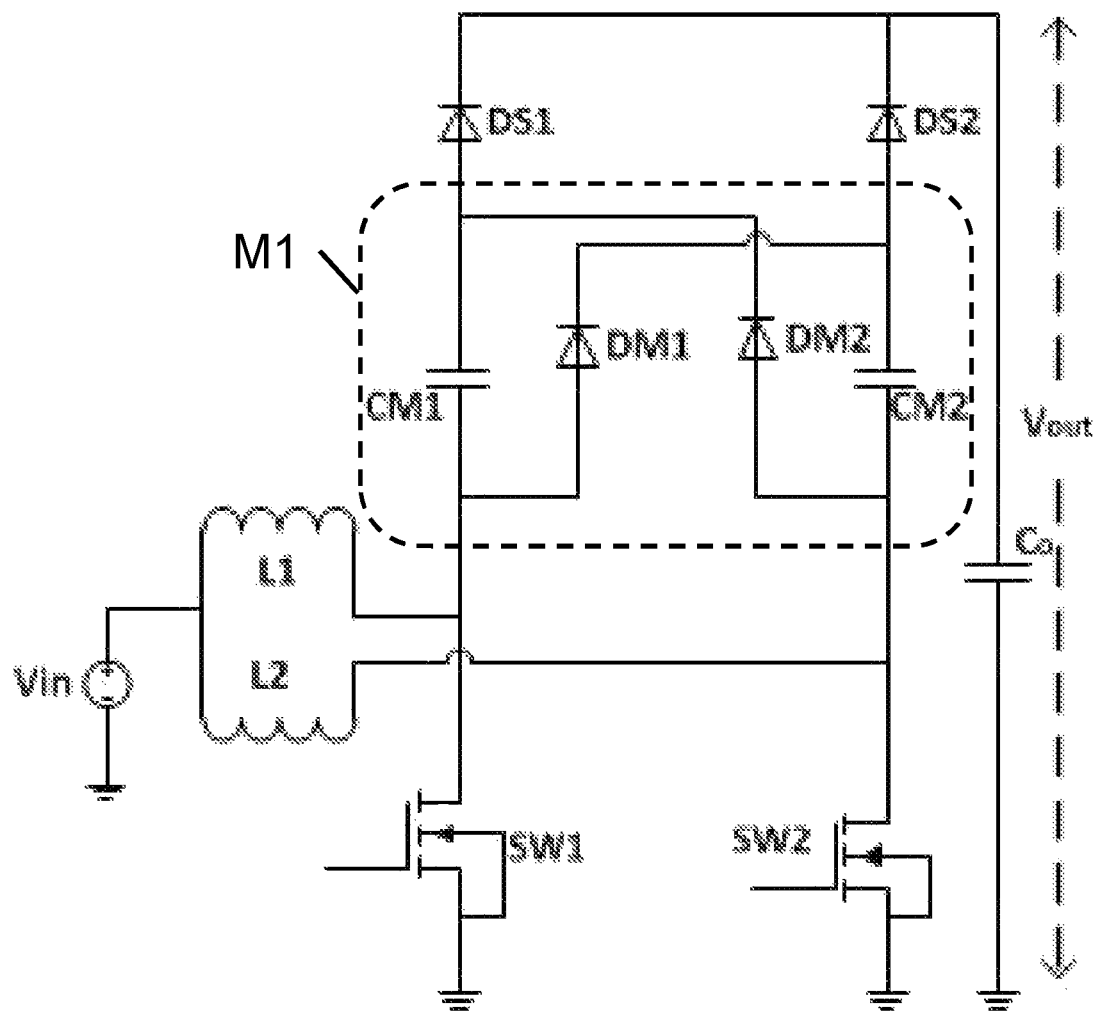
FIG. 1 illustrates a topology of a DC-DC power converter, which may be used as an intra-module DC-DC power converter in a photovoltaic unit, known in the art.

The drawings are only schematic and are non-limiting. In the drawings, the size of some of the elements may be exaggerated and not drawn on scale for illustrative purposes.

DETAILED DESCRIPTION OF PREFERRED EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

By way of illustration, embodiments of the present invention not being limited thereto, different embodiments of the present invention will now be discussed in somewhat more detail.

In this document, the terms "switching devices" and "switches" are used as synonyms.

Where in this document reference is made to "low-frequency switch", and "high-frequency switch", what is meant is that the former switch is changed state at a lower frequency than the latter switch. In the context of the present invention, "low-frequency" means less than 200 Hz, and "high-frequency" means between 10 kHz and 250 kHz.

In the present invention, the term "duty ratio" and "duty cycle" and "duty cycle ratio" are used as synonyms.

As used herein, the term "intra-module" means at the substring level inside e.g. a PV module.

Embodiments of the present invention provide a DC-DC power converter circuit comprising at least two, for example two multiplier stages M1, M2, whereby each multiplier stage comprises two diodes and two capacitors, arranged so as to multiply a voltage level of a varying DC input voltage source with a factor, referred to as "voltage gain". The variable DC input voltage may originate for example from a photovoltaic module (PV module).

The output voltage of a PV module is varied dynamically based on the illumination condition and partial shading, depending on the mismatches present within substrings. Embodiments of the present invention advantageously provide a non-isolated DC-DC converter to operate in a "wide input voltage range". (for example ranging from about 10.0 V to about 40.0 V in case of two multiplier stages). Moreover, the present invention enables one to increase voltage gain range of the DC-DC converter which can be connected in series with the PV module or in series with a PV substring inside a PV module to deal with the shading effect.

According to an aspect of the present invention, a DC-DC power converter is provided with at least two multiplier stages, but the number of multiplier stages can be interchanged in order to increase the voltage gain range of the converter according to the output voltage from PV stages. In other words, the effective number of multiplier stages of the DC-DC power converter circuit of the present invention can be dynamically adjusted, thereby providing a DC-DC power converter circuit having an increased voltage gain range.

A voltage multiplier non-isolated DC-DC boost converter topology is known in the art, for instance as presented by Prudente et al in IEEE Transactions on Power Electronics, Vol. 23, pp. 871-887. Two capacitors and two diodes form a multiplier stage which is integrated in boost converter with the possibility to increase several stages to achieve high gain. Voltage gain of such a converter is a function of duty ratio (D) and the number of multiplier stages (M). For example, for a duty cycle of 75%, a voltage gain factor of about 8 can be achieved with a single multiplier stage. In this topology, voltage stress across the power switch SW1, SW2 is proportional with duty ratio if the number of multiplier stage is assumed to be constant. The inventors have modified this topology by introducing interchangeability between different multiplier stages of the converter to achieve wider voltage gain range without compromising the efficiency, considering the voltage stress of power switch. Here, the topology is interchanged between one multiplier stage and two multiplier stages according to the input voltage and gain requirement by using low frequency voltage controlled switch. This method can be applied to exchange between different multiplier stages M=1, 2, 3 or higher. In other words, by adding switches to the topology of existing multi-stage DC-DC power converters, a circuit with two multiplier stages can be configured "to behave" as a circuit having only a single multiplier stage, or as a circuit having two multiplier stages connected in series.

As indicated above, a non-isolated high gain boost converter topology has been chosen to implement as an intra-module DC-DC converter. According to the design specifications the intra-module converter has been designed and the suitability of the designed converter. Wide input voltage range is one of the main criterions of module level and substring level converter in PV application. In order to address shading effect wide input voltage range needs to be selected to operate the converters dynamically. Because of the partial shading, solar cells are illuminated with different irradiance level and so each of them has different current-voltage characteristics. Minimum input voltage of the intra-module converter needs to be sufficiently low so that it will handle low voltage output from PV cells even in shading conditions. The maximum input voltage of the converter should be high enough to address the output of the fully illuminated module when no shading and thus no mismatches are present within substrings. Therefore, wide input voltage range is advantageous to operate the intra-module converter dynamically based on illumination condition, depending on the mismatches present within substrings.

FIG. 1 is a schematic diagram of the topology of the prior art circuit discussed above. In this topology, capacitors CM1, CM2 and diodes DM1, DM2 form a multiplier stage (M) which is integrated in boost converter with the possibility to increase several stages to achieve high gain. Two multiplier capacitors CM1, CM2 are connected with two multiplier diodes DM1, DM2 to form a multiplier stage M1. The diodes DS1 and DS2 are output diodes. Two power switches SW1, SW2 are connected in parallel. In this figure, the number of multiplier stages is one. The voltage gain of this circuit is a function of duty ratio (D) and the number of multiplier cell (M). The static gain (Av) of the converter is shown in equation below, where M is the number of multiplier stages and D is duty ratio of the converter.

$$Av=(M+1)/(1-D) \qquad [1]$$

In this topology, voltage stress across the power switches SW1, SW2 is proportional with duty ratio if the number of multiplier stage M is assumed to be constant. However, voltage stress across the power switches SW1, SW2 is possible to reduce by increasing the number of multiplier stages without varying the duty ratio. It entails that voltage stress across the power switches SW1, SW2 (e.g. power MOSFETs) will be lower for M=2 compared to voltage stress for M=1, to achieve a given high voltage gain such as for example Av=12. Once a particular number of multiplier stages is chosen, for example M=2, this number is fixed, and it is not possible anymore to operate this converter having two multiplier stages (M=2) to attain a low voltage gain of for example 3.0 Therefore, to achieve high efficiency by reducing the voltage stress across the power switches will impose the inability to push the lower bound of the gain range to accept wider input voltage range for this converter. In practice, the duty cycle may be controlled within the range of about 0.25 to about 0.75. It can be seen from Table 1 that in this operating range of duty ratio, the voltage gain range for a circuit with M=1 is 2.66 to 8 and for a circuit with M=2 is 4 to 12. Hence, it is not possible to operate this topology in a wide voltage gain range such as for example from 3 to 12 without compromising the efficiency.

The voltage gain of circuits with 1, 2 and 3 multiplier stages in the optimal operating range of duty ratio from 0.25 to 0.75 is shown in Table 1. As can be seen, the voltage gain range is limited to the range from 2.66 to 8.0 for M=1, and is limited to the range from 4.0 to 12.0 for M=2, and is limited to the range from 5.33 to 16 for M=3.

TABLE 1

Voltage gain range of for prior art circuit with 1, 2 or 3 multiplier stages.

| Multiplier Stage(M) | Duty Ratio(D) | Voltage Gain($A_v$) |
|---|---|---|
| M = 1 | 0.25 | 2.66 |
|  | 0.75 | 8 |
| M = 2 | 0.25 | 4 |
|  | 0.75 | 12 |
| M = 3 | 0.25 | 5.33 |
|  | 0.75 | 16 |

The novel approach proposed by embodiments of the present invention allows to increase the voltage gain range for a circuit having for example two multiplier stages to be from 2.66 to 12 for a duty-cycle range from 0.25 to 0.75. The inventors found that the above described limitation of prior art circuits can be overcome by introducing interchangeability between the different multiplier stages, as is done in DC-DC power converters according to embodiments of the present invention. The present invention therefore provides a novel structure which can interchange between different multiplier stages dynamically to provide a wider voltage gain range. This will help to operate intra-module converter within wide input voltage range, which will eventually facilitate to deal with varying output voltage of PV module due to (inter alia) partial shading.

Example 1: Operation Principle of a Circuit According to Embodiments of the Invention Comprising Two Voltage Controlled Low Frequency Switches S1, S2

Figure 2:
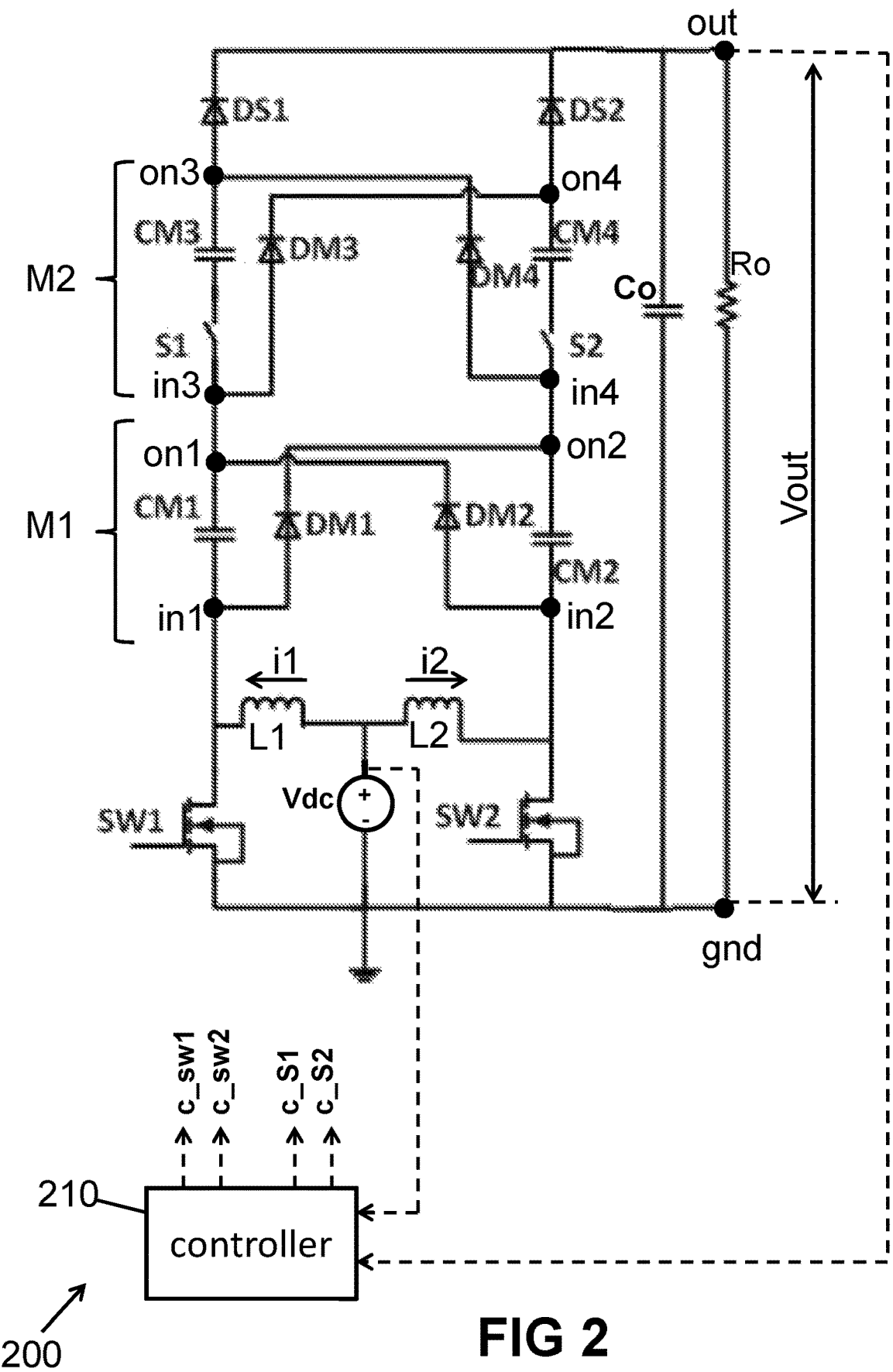
FIG. 2 illustrates an embodiment of an intra-module DC-DC power converter according to embodiments of the invention, said converter comprising two relatively low-frequency switching devices S1, S2 and two relatively high-frequency switching devices SW1, SW2.

FIG. 2 shows an embodiment of a DC-DC power converter circuit according to the present invention, wherein two low frequency voltage controlled switches S1, S2 are connected between nodes of the two multiplier stages. In the example illustrated, switch S1 is connected in series with capacitor CM3 between input node in3 and output node on3, and switch S2 is connected in series with CM4 between input node in4 and output node on4.

In a first mode of operation, when both S1 and S2 are opened, the converter will behave like a prior-art circuit having only a single multiplier stage (M=1). Indeed, the multiplier capacitors CM3, CM4 are bypassed and the current will go to the output load (not shown) either through DM3 and DS2 or via DM4 and DS1, depending on which of the power switches (SW1 or SW2) is ON, and which is OFF. In other words, the second multiplier stage M2 is "substantially bypassed" (apart from the diodes DM3, DM4).

In a second mode of operation, when both S1 and S2 are closed, the converter will behave like a prior-art circuit having two multiplier stages (M=2).

By providing the switches S1, S2, the circuit of the present invention thus combines the advantages of both prior art circuits (low gain factor of 2.66 for circuit with M=1, and high gain factor of 12 for circuit with M=2), by allowing the circuit of FIG. 2 to be configured to selectively act as a DC-DC power converter having only a single multiplier stage (M=1) when a low voltage gain is required or desired, and to act as a DC-DC power converter having two multiplier stages (M=2) when a high voltage gain is needed or desired.

The "high-frequency" power switches SW1, SW2 would typically be operated at a constant frequency (for example about 50 kHz), but with a varying duty cycle ratio. The "low frequency" switches S1, S2 would typically be occasionally opened or closed. The high-frequency switches may be controlled by control signals c_SW1 and c_SW1, typically PWM signals, and the low-frequency switches S1, S2 may be controlled by signals c_S1 and c_S2, which may be generated by GPIO-pins (general-purpose input-output pins) of a controller 210, for example a programmable microcontroller. Optionally, the controller may also use the output of the DC-DC power converter, (or a fraction thereof, as can be obtained for example from a voltage divider), as an input signal.

The controller is provided with an algorithm that determines a suitable aspect ratio and that decides whether or not to bypass the second multiplier stage. The overall performance of the converter 200 and voltage stress across the power switches SW1, SW2 could be taken into account. The controller 210 may be part of the DC-DC power converter 200.

The DC-DC-power converter 200 according to this embodiment is designed and implemented in Spice to explore the feasibility of the converter. Real commercial model of MOSFETs and diodes have been used for all these simulations. In the simulation, the converter operation is in continuous conduction mode with 50 kHz operating frequency. Frequency of two voltage controlled switches S1, S2 is considered as 100 Hz for all the simulations (although in practice this would normally not be a periodic signal). By applying 0.75 duty cycle, it is possible to achieve a high voltage gain factor of 8 using only the first multiplier stage (S1, S2 closed), or a higher voltage gain of 12 when using both multiplier stages (S1, S2 open).

In a variant of the embodiment of FIG. 2 (not shown), the switches S1, S2 are added to the first multiplier stage, rather than to the second multiplier stage. In other words, in this embodiment, the first switching device (S1) is connected in series with the first capacitor (CM1) between the first input node (in1) and the first output node (on1), and the second switching device (S2) is connected in series with the second capacitor (CM2) between the second input node (in2) and the second output node (on2). This embodiment works similar to the embodiment shown in FIG. 2, and offers the same advantages. In a first mode of operation, when both S1 and S2 are opened, the converter will behave like a prior-art circuit having only a single multiplier stage (M=1), and the first multiplier stage M2 is "substantially bypassed" (apart from the diodes DM1, DM2). In a second mode of operation, when both S1 and S2 are closed, the converter will behave like a prior-art circuit having two multiplier stages (M=2).

Figure 3:
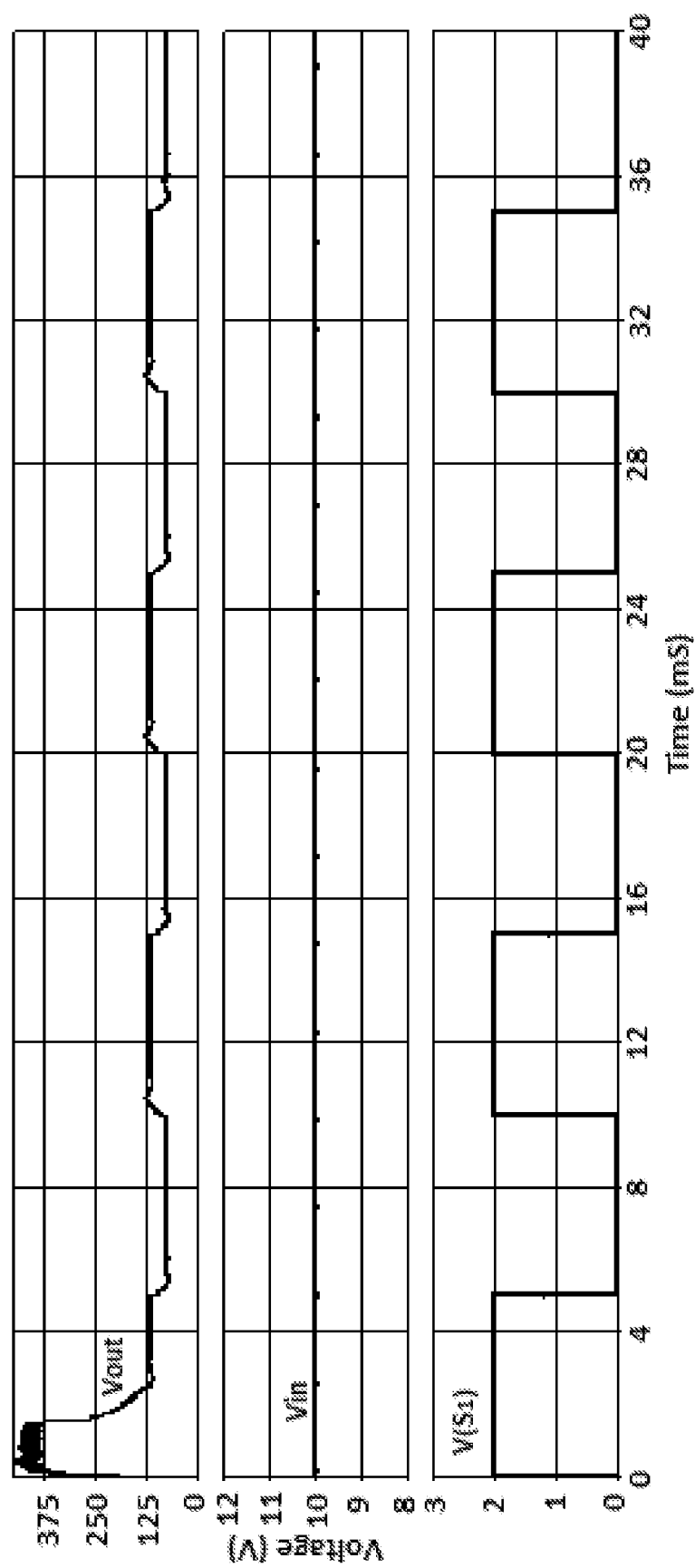
FIG. 3 shows a simulated output waveform of the DC-DC power converter of FIG. 2, when the low frequency switches are operated at 100 Hz.

FIG. 3 presents the converter operational waveform (simulated) when D=0.75 and demonstrates the workability of the proposed converter. In this simulation input voltage is considered as 10V. V(S1), V(S3) are the signals provided to operate two switches S1 and S3 respectively. S1, S3 are simultaneously on the same switching state. Output voltage of the converter Vout, input voltage of the converter Vin and voltage across the low frequency switch VS1 are shown here. It is found that when S1 and S2 are closed, the output voltage is approximately 120V and when they are open the output voltage is about 80V. The stability of the waveform can be improved by implementing the control scheme. Overshoot of the output voltage at the start-up phase may also be controlled by the controller 210.

The DC-DC power converter according to embodiments of the present invention provide a wider input voltage range which is advantageous to track the variations of output voltage of PV module dynamically. The overall performance of the PV system will be improved by applying the power converter of wider input voltage range since low voltage output of shaded solar cells (and the substrings they belong to) will also be added to the overall output power, rather than being simply ignored. Advantageously the converter according to embodiments of the present invention helps to operate the converter in wider input voltage range by reducing voltage stress across the power switches SW1, SW2. It also helps to achieve best possible efficiency at a specific voltage gain by optimizing the usage of the number of multiplier stages based on duty cycle, voltage stress across power switches and power loss in diodes. Another benefit of this topology is that not all the passive and switching components are in operation all the time. Because when the module is fully illuminated then lower voltage gain is required, thus converter with one multiplier stage is in operation and that way reliability of the converter as a whole will be improved. Moreover, this novel approach is useful for intra-module converter which are connected with substrings inside the module and also for module integrated converter. Since, module level converter also needs to work with wide range of module's output voltage which varies dynamically depending on illumination condition.

Example 2: Operation Principle of a DC-DC Power Circuit According to Embodiments of the Invention Comprising Four Voltage Controlled Low Frequency Switches S1, S2, S3, S4

Figure 4:
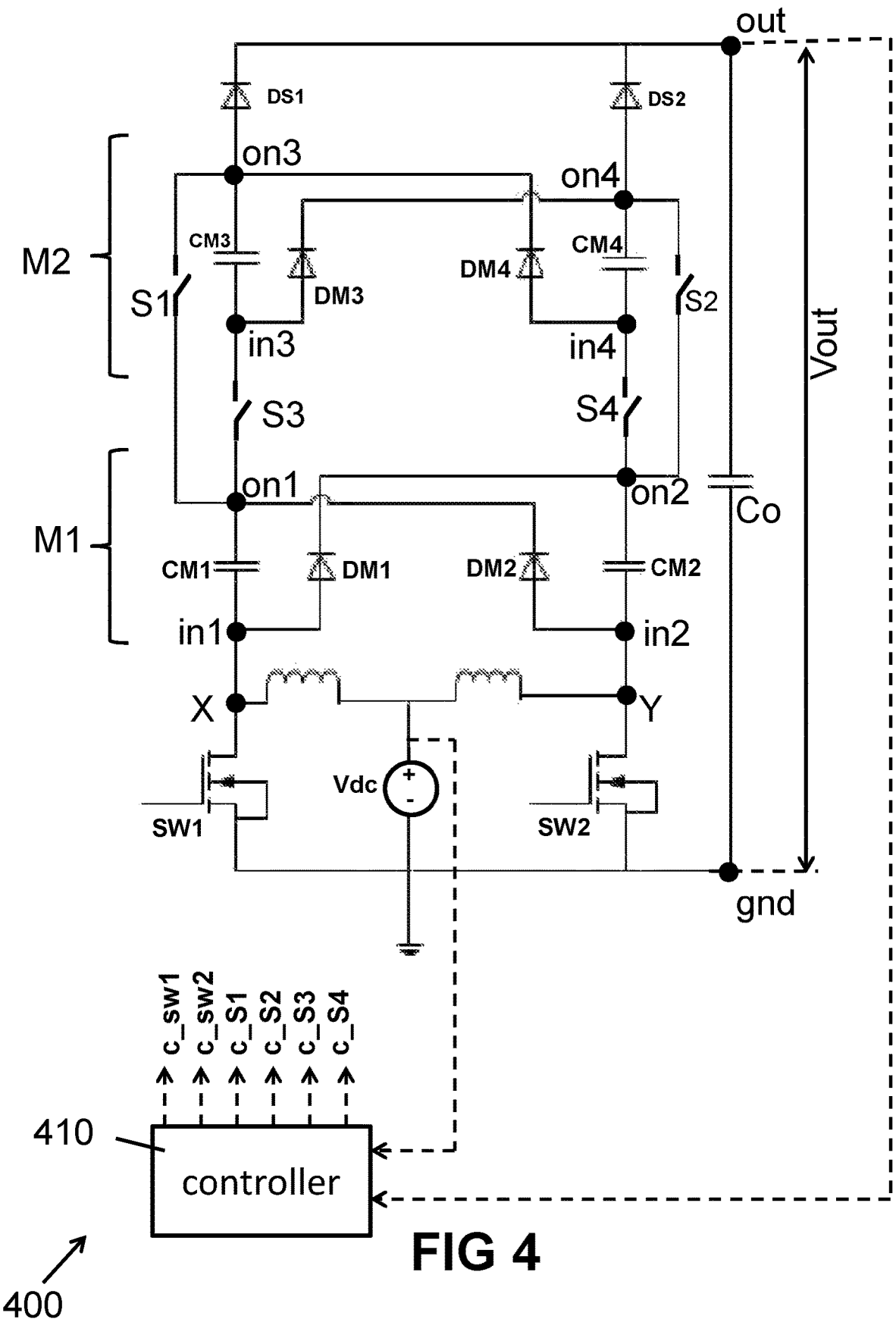
FIG. 4 illustrates an embodiment of a DC-DC power converter according to the present invention, which may be used as an intra-module DC-DC power converter in a photovoltaic unit. The converter comprises four relatively low-frequency switching devices S1, S2, S3, S4, and two relatively high-frequency switching devices SW1, SW2.

FIG. 4 shows a schematic diagram of another embodiment of a DC-DC power converter according to the present invention, having four switches S1, S2, S3, S4 rather than only two.

The idea is again to provide a DC-DC power convertor having a particular number of multiplier stages (implemented in hardware), but to allow to configure the topology to exchange between the multiplier stages dynamically based on the operating condition of the input voltage, e.g. the voltage Vdc provided by a PV module. To this end, four voltage controlled switches S1, S2, S3, and S4 are introduced in the circuit. These may be high-speed switches (e.g. power MOSFETs), but that is not required, because these switches would normally not be operated at high frequency. Therefore, low frequency switches such as for example electronic relays or solid state relays would also work.

According to the voltage gain requirement (for example, in certain applications, a predefined output voltage may be required irrespective of the input voltage), the converter will be operated with one multiplier stage or with two multiplier stages (or phrased differently: with one multiplier stage being bypassed, or not) by controlling these low frequency switches S1 to S4 at run time, for example by means of a controller 410. The switches S1 to S4 are connected between nodes of the two multiplier stages M1, M2. The four switches form two couples: a first couple formed by S1 and S2, and a second couple formed by S3 and S4. The switches within each couple have the same state, and the switches of different couples have different states. In other words, S1 and S2 are closed at the same time, and are open at the same time. The same applies for S3 and S4, which are open or closed at the same time. in contrast, when S1 (and thus also S2) is closed, then S3 (and thus also S4) is open, and vice versa.

In a first mode of operation, the switches S1 and S2 are open, and the switches S3 and S4 are closed. In this state, the DC-DC power converter circuit of FIG. 4 is configured to act as a series connection of two multiplier stages M1 and M2. This mode can be used for example when a high voltage gain (for example Av>8) is needed.

In a second mode of operation, the switches S1 and S2 are closed, and the switches S3 and S4 are open. In this mode, the second multiplier stage M2 is bypassed completely. This mode can be used for example when a low voltage gain (for example Av<4) is needed.

For a voltage gain in the range from 4 to 8, any of the first mode and second mode may be used, but the duty cycle would be different.

Especially in this intermediate range, the overall performance (e.g. power efficiency) of the converter 400 and/or voltage stress across the power switches SW1, SW2 may also be considered in order to determine the preferred number of multiplier stages to be used (or more precisely: whether to bypass the second multiplier stage, or not).

The four low frequency switches S1, S2, S3, S4 are preferably controlled by a controller 410 at run time, based on voltage of the input voltage Vdc, for example the PV cells output or more accurately: the voltage of a PV substring (which is a series connection of PV cells).

By implementing the novel approach of FIG. 4, the converter will advantageously be working with wider voltage gain range by reducing voltage stress across the power switches SW1, SW2. DC-DC converter with wider input voltage range (in the example from 2.66 to 12) is advantageous to track the variations of the output voltage of PV modules dynamically over a wider range.

When providing a PV panel with one DC-DC power converter per substring, the overall performance of the PV panel, and thus also the PV system comprising that PV panel will be improved, because the power originating from partially shaded substrings (causing a lower voltage output of the sub string), would also be added to the output power, rather than being simply ignored, as is the case in many existing PV panels having a so called "bypass diode". The proposed converter according to embodiments of the invention advantageously helps to operate the converter in wider input voltage range. It also helps to achieve best possible efficiency at a specific voltage gain by optimizing the usage of the number of multiplier stages based on duty cycle, voltage stress across power switches and power loss in diodes. Another benefit of the DC-DC power converter of FIG. 4 is that not all the passive components are in use all the time. Because when the module is fully illuminated, the lower voltage gain is required, thus one multiplier stage will be bypassed.

The proposed converter 400 according to embodiments of the invention, comprising four switches S1-S4, is designed and implemented in Spice to explore the feasibility of the converter. Real commercial model of MOSFETs and diodes have been used for all these simulation. In this simulation, the converter operation is in continuous conduction mode with the power switches being operated at 50 kHz operating frequency. Although the four low-frequency switches S1-S4 would normally not be operated periodically, but depending for example on whether the input voltage Vdc is low or high, for the purpose of the simulation, these switches were operated with a frequency of 100 Hz for all the simulations. By applying 0.75 duty cycle, it is possible to selectively achieve a high voltage gain of 8 with only a single multiplier stage (second mode of the converter), but also a higher voltage gain of 12 when using both multiplier stages (first mode of the converter).

In a variant of FIG. 4 (not shown), the position of the first and second multiplier stage M1, M2 are swapped, or in other words, the switch S1 would be arranged between node X and node on1, the switch S2 would be arranged between node Y and node on2, the switch S3 would be arranged between node X and node in1, and the switch S4 would be arranged between node Y and node in2. This circuit would behave similar to the circuit shown in FIG. 4, and offer the same advantages, except that in this case, of course, the first multiplier stage M1 can be bypassed, or not.

Figure 5:
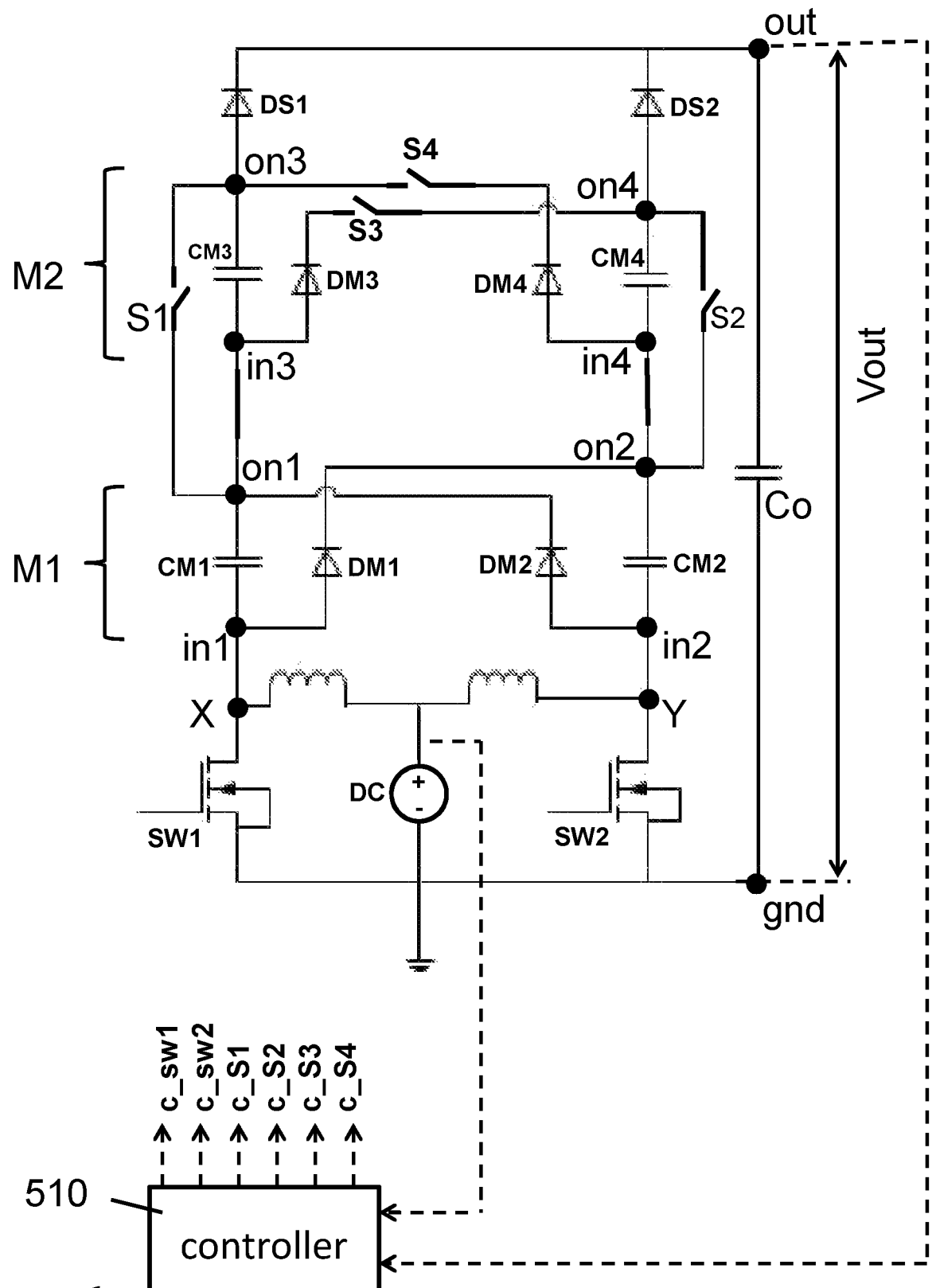
FIG. 5 shows a first variant of the circuit of FIG. 4.

FIG. 5 shows a variant of the DC-DC power converter of FIG. 4. Everything described for the converter of FIG. 4 is also applicable for the converter of FIG. 5. In particular, the circuit of FIG. 5 is configurable in a first mode (S1 and S2 open, S3 and S4 closed) wherein the two multiplier stages are connected in series, and both contribute to the output voltage multiplication; or in a second mode (S1 and S2 closed, S3 and S4 open wherein the second multiplier stage is completely bypassed, and does not contribute to the overall voltage multiplication. Further variants are possible, for example, the relative position of the diode DM3 and the switch S3 could be interchanged. Likewise, the relative position of the diode DM4 and the switch S4 could be interchanged.

In a variant of FIG. 5 (not shown), the position of the first and second multiplier stage M1, M2 are swapped, or in other words, the switch S1 would be arranged between node X and node on1, the switch S2 would be arranged between node Y and node on1, the switch S3 would be arranged in series with diode DM1 between node in1 and node on2, and the switch S4 would be arranged in series with diode DM2 between node Y and node on1. This circuit would behave similar to the circuit shown in FIG. 5, and offer the same advantages, except that in this case, of course, the first multiplier stage M1 can be bypassed, or not.

Figure 6:
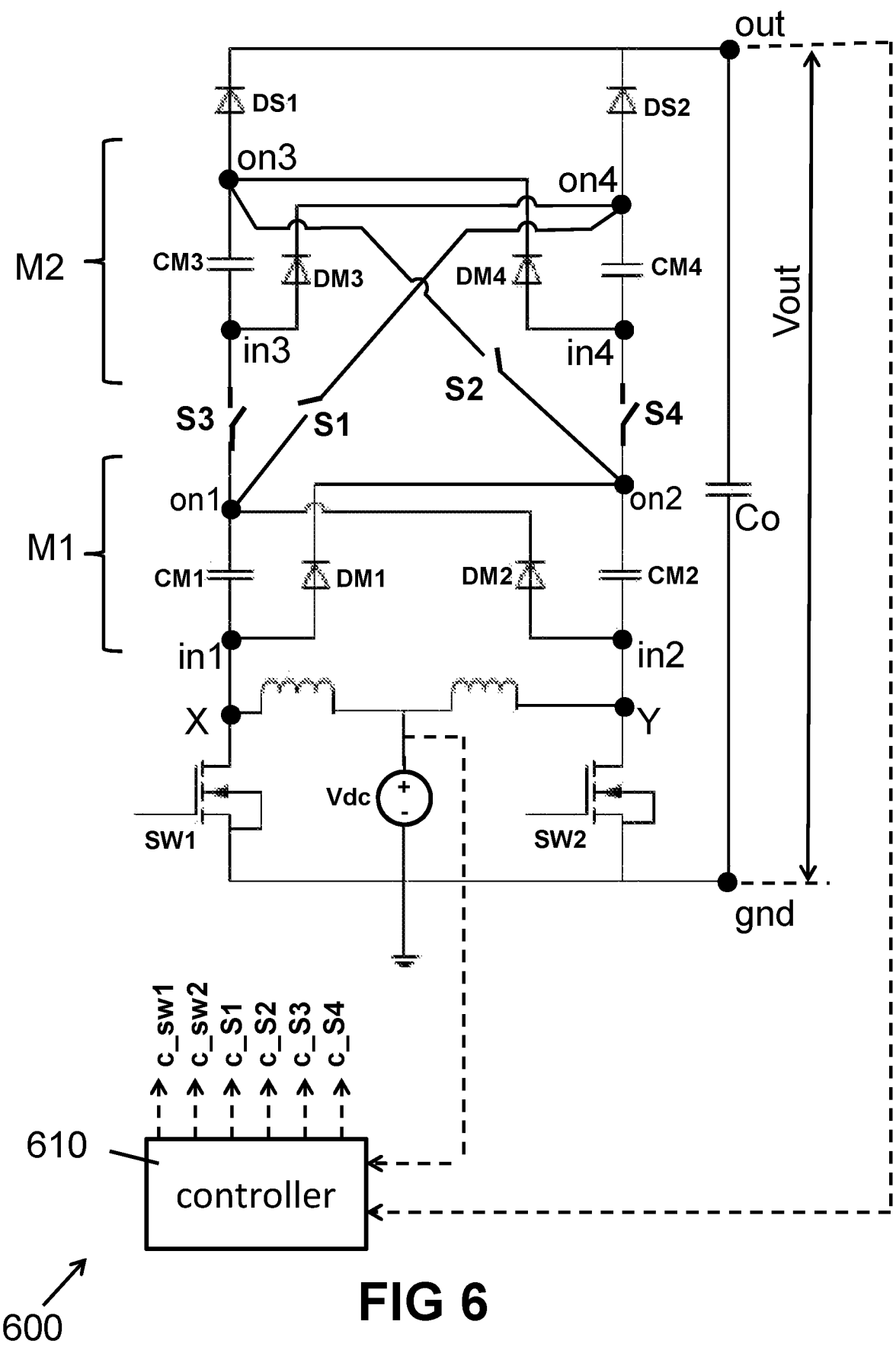
FIG. 6 shows a second variant of the circuit of FIG. 4.

FIG. 6 shows another variant of the DC-DC power converter of FIG. 4. Everything described for the converter of FIG. 4 is also applicable for the converter of FIG. 6. In particular, the circuit of FIG. 6 is configurable in a first mode (S1 and S2 open, S3 and S4 closed) wherein the two multiplier stages are connected in series, and both contribute to the output voltage multiplication; or in a second mode (S1 and S2 closed, S3 and S4 open wherein the second multiplier stage is completely bypassed, and does not contribute to the overall voltage multiplication.

In a variant of FIG. 6 (not shown), the position of the first and second multiplier stage M1, M2 are swapped, or in other words, the switch S1 would be arranged between node X and node on2, the switch S2 would be arranged between node Y and node on1, the switch S3 would be arranged between node X and node in1, and the switch S4 would be arranged between node Y and node in2. This circuit would behave similar to the circuit shown in FIG. 6, and offer the same advantages, except that in this case, of course, the first multiplier stage M1 can be bypassed, or not.

Figure 7:
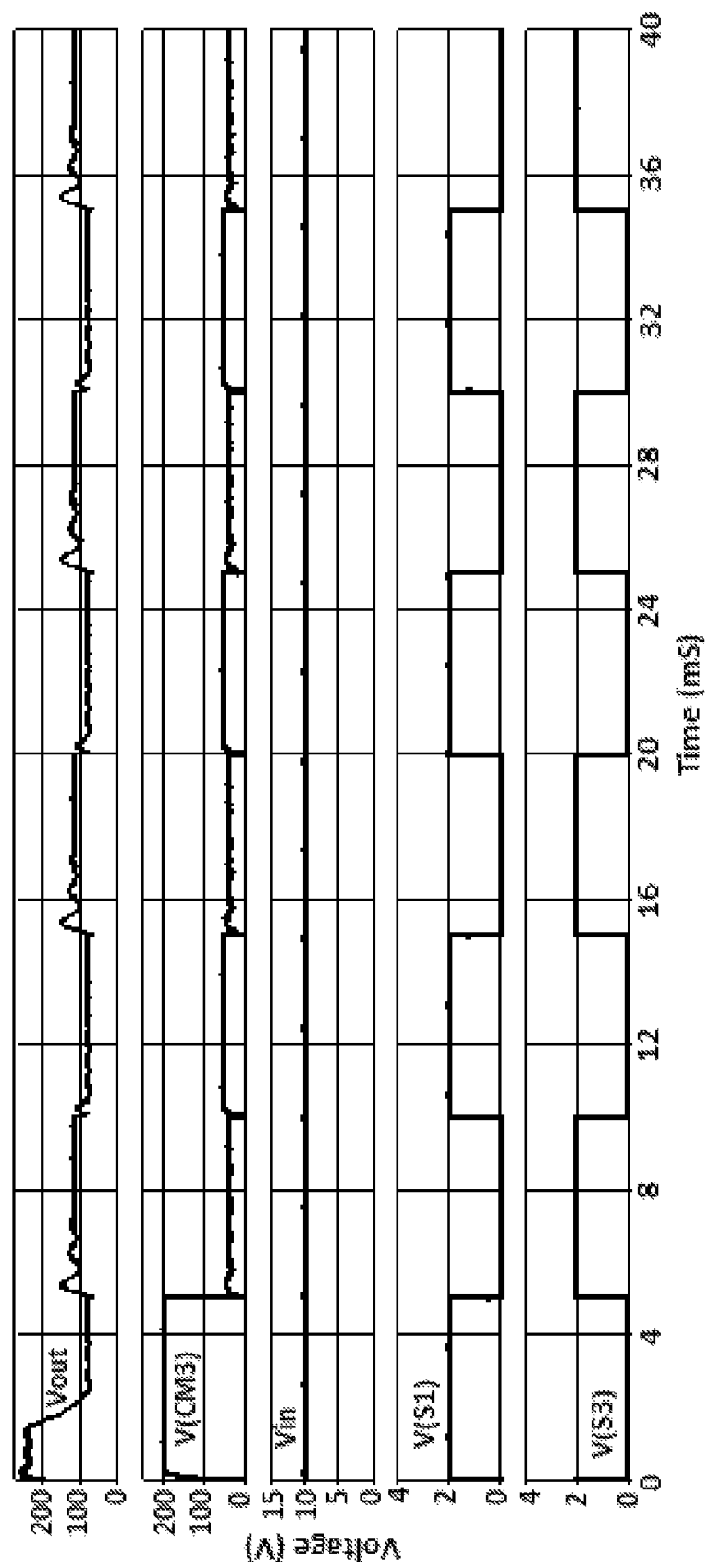
FIG. 7 illustrates a simulated output waveform of the DC-DC power converter of FIG. 4, when the low frequency switches are operated at 100 Hz.

FIG. 7 presents a simulation of the output voltage of the DC-DC power converter of FIG. 4 (comprising four switches) for input voltage=10V and when duty cycle is set at D=0.75, and demonstrates the workability of the proposed converter. V(S1) is the signal provided to operate the switches S1 and S2 and V(S3) is the signal to operate the switches S3 and S4. Output voltage of the converter Vout, input voltage of the converter Vin and voltage across the multiplier capacitor V(CM3) are shown. It is found that when S1 and S2 are closed (and thus S3 and S4 open), the output voltage is approximately 80V (thus Av=8), and that when S1 and S2 are open (thus S3 and S4 is closed) the output voltage is about 120V (thus Av=12). The stability of the waveform may be improved by implementing a control scheme. Overshoot of the output voltage at the start-up phase may also be controlled by the controller.

Figure 8:
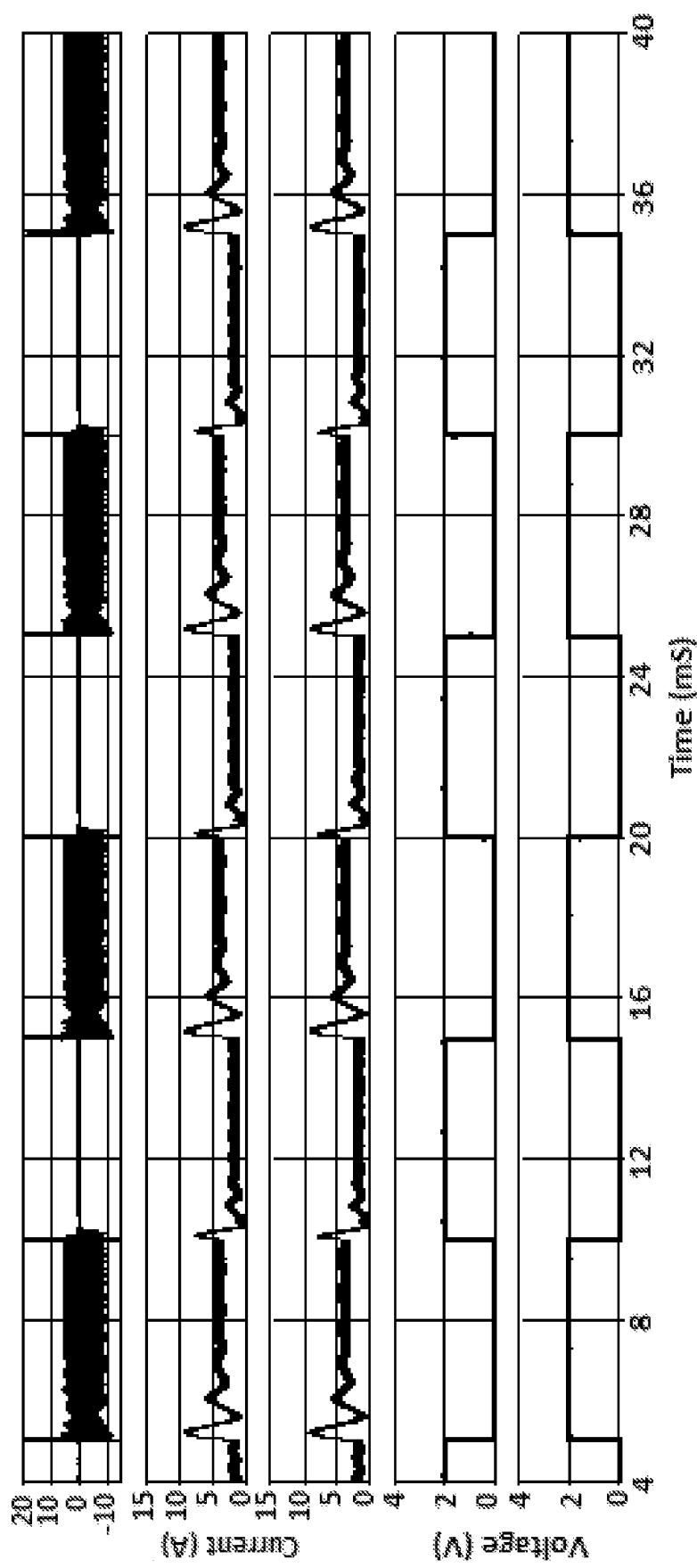
FIG. 8 illustrates simulated current waveforms of inductor currents and multiplier capacitor currents of the DC-DC power converter of FIG. 4.

FIG. 8 shows simulated current waveforms of the DC-DC converter of FIG. 4. The input voltage and the duty cycle are kept same for this simulation as well. The control signal V(S1) for the switches S1 and S2 and the control signal V(S3) for the switches S3 and S4, the current of the two inductors I(L1), I(L2) and the current I(CM3) of the multiplier capacitor CM3 are shown. The simulated current waveforms are presented to verify the functionality of the converter. It is seen that two inductor currents follow the interchangeability between the multiplier stages. Current through the multiplier capacitor becomes zero when S1 and S2 are closed which signifies that the second multiplier stage M2 formed by CM3, CM4 and DM3, DM4 is completely bypassed, thus the circuit with two multiplier stages acts as if M=1. This demonstrates the viability of the proposed converter. The proposed converter advantageously is able to interchange between multiplier stages dynamically and eventually make voltage gain range wider which is useful to operate the converter in wide input voltage range.

The DC-DC power converters described above all have an increased voltage gain range, and can advantageously be used in PV applications, especially as an intra-module converter.

It is quite evident that the output power of the PV module is highly influenced by the partial shading. As a potential solution numerous types of low power non-isolated DC-DC converter are presented in research literature to use as a distributed power converter in PV application. However, embodiments of the present invention provide a novel structure or circuit of a non-isolated DC-DC converter to use in a PV application. The converter according to embodiments of the invention is advantageously designed with wider voltage gain range specially to address the fluctuation of output voltage of PV cells.

Embodiments of the present invention provide a novel approach to deal with the fluctuation of the output voltage of the PV substrings more efficiently by increasing voltage gain range and eventually increasing input voltage range of the DC-DC converter. Moreover, there are benefits in providing a wider input voltage range for a DC-DC converter in the PV application.

Embodiments of the present invention advantageously provide a novel approach to deal with the fluctuation of the output voltage of the PV substrings more efficiently by increasing voltage gain range and eventually increasing input voltage range of a non-isolated DC-DC converter.

Advantageously embodiments of the present invention provide ultra-wide gain range auto-reconfigurable non-isolated DC-DC converters.

The value of input parameters the DC-DC converter according to the invention can be changed according to requirement. If for instance one wants to use the converter at module level, then the input voltage range is preferably higher than when it is used as an intra-module converter. Output voltage can also be changed accordingly.

It can apply in the following scenario if the output voltage is 360V, the input voltage range, in embodiments without auto-reconfigurable approach, can be between 30 to 78 V, whereas the voltage gain rage is between 12 to 4.6. In embodiments, where an auto-reconfigurable approach is provided, the input voltage can be between 30 to 116 V, with a voltage grain range of 12 to 3.1. In both embodiments the optimum duty cycle range is preferably between 0.75 and 0.35. Therefore, we can see in this approach that basically voltage gain range is increased in an optimum duty cycle range without compromising efficiency. Now, based on the voltage gain range the input and output voltage range can be varied as per the requirement.

It is also to be understood that the terminology used herein is for purposes of describing particular embodiments only, and is not intended to be limiting. It must be noted that, as used in the specification and the appended claims, the singular forms "a", "an" and "the" include singular and/or plural referents unless the context clearly dictates otherwise. It is also to be understood that plural forms include singular and/or plural referents unless the context clearly dictates otherwise. It is moreover to be understood that, in case parameter ranges are given which are delimited by numeric values, the ranges are deemed to include these limitation values.

The invention claimed is:

1. A photovoltaic unit comprising:
at least two substrings connected in parallel, each substring comprising a plurality of solar cells connected in series, and each substring comprising at least one DC-DC power converter connected in series with the series connection of the solar cells for functioning as an intra-module DC-DC power converter;
wherein the DC-DC power converter comprises:
at least two multiplier stages, each multiplier stage comprising two capacitors, each capacitor respectively connected to a diode, said diodes being adapted to charge the capacitors with a voltage;
a first multiplier stage comprising:
a first and a second input node and a first and a second output node; and
a first capacitor connected between the first input node and the first output node, and a second capacitor connected between the second input node and the second output node; and
a first diode connected with its anode to the first input node and with its cathode to the second output node, and a second diode connected with its anode to the second input node and with its cathode to the first output node;
a second multiplier stage comprising:
a third and a fourth input node and a third and a fourth output node; and
a third capacitor connected between the third input node and the third output node, and a fourth capacitor connected between the fourth input node and the fourth output node; and
a third diode connected with its anode to the third input node and with its cathode to the fourth output node, and a fourth diode connected with its anode to the fourth input node and with its cathode to the third output node;
the first output node being connected to the third input node and the second output node being connected to the fourth input node;
at least two switching devices,
wherein the at least two switching devices comprise at least a first and a second switching device arranged to selectively connect the at least two multiplier stages in series in a first mode of operation, and to at least partly bypass one of the at least two multiplier stages in a second mode of operation, thereby increasing the voltage gain range of the DC-DC power converter.

2. The photovoltaic unit of claim 1,
wherein the first switching device is connected in series with the first capacitor between the first input node and the first output node, and the second switching device is connected in series with the second capacitor between the second input node and the second output node, or
wherein the first switching device is connected in series with the third capacitor between the third input node and the third output node, and the second switching device is connected in series with the fourth capacitor between the fourth input node and the fourth output node.

3. The photovoltaic unit of claim 1, wherein the DC-DC power converter further comprises a third and a fourth switching device, and one of the following alternatives:
a) wherein the first switching device is connected between the first output node and the third output node, and the second switching device is connected between the second output node and the fourth output node, and the third switching device is connected between the first output node and the third input node, and the fourth switching device is connected between the second output node and the fourth input node;
b) wherein the first switching device is connected between the first output node and the third output node, and the second switching device is connected between the second output node and the fourth output node, and the third switching device is connected in series with the third diode between the third input node and the fourth output node, and the fourth switching device is connected in series with the fourth diode between the fourth input and the third output node;
c) wherein the first switching device is connected between the first output node and the fourth output node, and the second switching device is connected between the second output node and the third output node, and the third switching device is connected between the first output node and the third input node and the fourth switching device is connected between the second output node and the fourth input node.

4. The photovoltaic unit of claim 1, wherein the DC-DC power converter further comprises:
a first protection diode connected with its anode to the third output node of the second multiplier stage and with its cathode to an output node of the DC-DC converter; and
a second protection diode connected with its anode to the fourth output node of the second multiplier stage and with its anode to the output node of the DC-DC power converter; and
an output capacitor connected between a ground node of the DC-DC converter and the output node of the DC-DC power converter.

5. The photovoltaic unit of claim 1, wherein the DC-DC power converter further comprises:
a first power switch arranged between a ground node and the first input node of the first multiplier stage and adapted for pulling a first current through a first inductance connectable to said first input node;

a second power switch arranged between the ground node and the second input node of the first multiplier stage and adapted for pulling a second current through a second inductance connectable to said second input node.

6. The photovoltaic unit of claim 5, wherein the at least two switching devices are adapted to be operated at a frequency lower than the frequency of the power switches.

7. The photovoltaic unit of claim 1, wherein the at least two switching devices are electrical relays or solid state relays.

8. The photovoltaic unit of claim 1, wherein the DC-DC power converter further comprises a first inductance connected to the first input node and a second inductance connected to the second input node.

9. The photovoltaic unit of claim 1,
wherein the DC-DC power converter is a non-isolated power converter, or
wherein the DC-DC power converter is a boost power converter.

10. The photovoltaic unit of claim 1, further comprising a controller adapted for selectively opening and closing the at least two switches.

11. The photovoltaic unit of claim 10, wherein the controller is further adapted for determining a duty cycle, and for generating a control signal with the determined duty cycle, and for applying the control signal to the first and second power switches.

12. A power system for controlling a plurality of photovoltaic units according to claim 1, the power system comprising:
a first photovoltaic unit adapted for generating a first voltage;
a second photovoltaic unit adapted for generating a second voltage;
the first photovoltaic unit and the second photovoltaic unit being connected in parallel or in series;
a controller adapted to control the first voltage and the second voltage.

13. The power system of claim 12, further comprising an inverter for converting the DC-power generated by the first and the second photovoltaic unit and for injecting the converted power into a public grid.

14. A method of manufacturing a DC-DC power converter, comprising the steps of:
providing a first multiplier stage comprising:
a first and a second input node and a first and a second output node; and
a first capacitor connected between the first input node and the first output node, and a second capacitor connected between the second input node and the second output node; and
a first diode connected with its anode to the first input node and with its cathode to the second output node, and a second diode connected with its anode to the second input node and with its cathode to the first output node;
providing a second multiplier stage comprising:
a third and a fourth input node and a third and a fourth output node; and
a third capacitor connected between the third input node and the third output node, and a fourth capacitor connected between the fourth input node and the fourth output node; and
a third diode connected with its anode to the third input node and with its cathode to the fourth output node, and a fourth diode connected with its anode to the fourth input node and with its cathode to the third output node;
connecting the first multiplier stage to the second multiplier stage by connecting the first output node to the third input node and by connecting the second output node to the fourth input node;
adding a first and a second switching device to the first multiplier stage or to the second multiplier stage for at least partly bypassing the first or the second multiplier stage thereby increasing the voltage gain range of the DC-DC power converter.

15. The method of claim 14, comprising the steps of:
connecting the first switching device in series with the first capacitor between the first input node and the first output node, and
connecting the second switching device in series with the second capacitor between the second input node and the second output node, or
connecting the first switching device in series with the third capacitor between the third input node and the third output node, and
connecting the second switching device in series with the fourth capacitor between the fourth input node and the fourth output node.

16. The method of claim 15, further comprising the step of providing a third and a fourth switching device; and
connecting the first switching device between the first output node and the third output node, and
connecting the second switching device between the second output node and the fourth output node, and
connecting the third switching device between the first output node and the third input node and
connecting the fourth switching device between the second output node and the fourth input node.

17. The method of claim 15, further comprising the step of providing a third and a fourth switching device; and
connecting the first switching device between the first output node and the third output node, and
connecting the second switching device between the second output node to the fourth output node, and
connecting the third switching device in series with the third diode between the third input node, and
connecting the fourth output node, and the fourth switching device in series with the fourth diode between the fourth input node and the third output node.

18. The method of claim 15, further comprising the step of providing a third and a fourth switching device; and
connecting the first switching device between the first output node and the fourth output node, and
connecting the second switching device between the second output node and the third output node, and
connecting the third switching device between the first output node and the third input node, and
connecting the fourth switching device between the second output node and the fourth input node.

* * * * *